United States Patent
Adamovits et al.

(10) Patent No.: US 6,698,017 B1
(45) Date of Patent: Feb. 24, 2004

(54) SOFTWARE MIGRATION ON AN ACTIVE PROCESSING ELEMENT

(75) Inventors: Peter Joseph Adamovits, Carleton Place (CA); Keith Clifford Dysart, Stitsville (CA); Louis Pierre Berube, Carp (CA)

(73) Assignee: Nortel Networks Limited, Montreal (CA)

( * ) Notice: Subject to any disclaimer, the term of this patent is extended or adjusted under 35 U.S.C. 154(b) by 0 days.

(21) Appl. No.: 09/356,044

(22) Filed: Jul. 16, 1999

(51) Int. Cl.[7] .................................................. G06F 9/44
(52) U.S. Cl. ........................................................ 717/168
(58) Field of Search .......................................... 717/168

(56) References Cited

U.S. PATENT DOCUMENTS

| | | | | |
|---|---|---|---|---|
| 5,339,430 A | * | 8/1994 | Lundin et al. | 709/332 |
| 5,359,730 A | | 10/1994 | Marron | |
| 5,410,703 A | * | 4/1995 | Nilsson et al. | 717/168 |
| 5,555,418 A | * | 9/1996 | Nilsson et al. | 717/153 |
| 5,680,640 A | * | 10/1997 | Ofek et al. | 710/19 |
| 5,819,061 A | * | 10/1998 | Glassen et al. | 709/1 |
| 5,822,780 A | * | 10/1998 | Schutzman | 711/165 |
| 5,922,072 A | * | 7/1999 | Hutchinson et al. | 713/2 |
| 6,145,066 A | * | 11/2000 | Atkin | 711/165 |
| 6,199,179 B1 | * | 3/2001 | Kauffman et al. | 714/26 |
| 6,247,109 B1 | * | 6/2001 | Kleinsorge et al. | 712/13 |
| 6,308,182 B1 | * | 10/2001 | Nishigaya et al. | 707/103 R |
| 2001/0001870 A1 | | 5/2001 | Ofek et al. | 711/112 |

FOREIGN PATENT DOCUMENTS

| | | | |
|---|---|---|---|
| EP | 0 683 453 A1 | 11/1995 | G06F/9/445 |
| WO | WO 94/01819 | 1/1994 | G06F/9/44 |
| WO | WO 96/10319 | 4/1996 | H04Q/3/545 |
| WO | WO 96/18146 | 6/1996 | G06F/9/445 |

* cited by examiner

*Primary Examiner*—Todd Ingberg

(57) ABSTRACT

A method, apparatus, and system are provided for performing a migration of control over a processing element from an original software system to a replacement software system. A replacement software system in memory associated with an active processing element is configured while an original software system controls the active processing element. The replacement software system is prepared to take control of the active processing element when state information is communicated to it from the original software system. Control of the active processing element is transferred to the replacement software system by a migration manager. A virtual machine may be used to facilitate the transfer of control, by interfacing between the active processing element, the original software system and the replacement software system. The virtual machine and original software system may be deactivated once control is transferred.

54 Claims, 8 Drawing Sheets

SOFTWARE MIGRATION ON AN ACTIVE PROCESSING ELEMENT

FIELD

The present invention relates generally to software migration and, more particularly, to the migration of control over a processing element from an original software system to a replacement software system.

BACKGROUND

Performing a software upgrade on computer hardware which is providing services to users or other computer devices presents significant challenges to maintaining the availability of such services during the upgrade. This is particularly the case when the services of the computer hardware are provided at least in part at the direction of the software being replaced in the upgrade. The process of upgrading or replacing the software that controls the computer hardware is often referred to as a software migration and involves replacing the original software with replacement software. During a conventional software migration, the services influenced by the operation of the original software are typically unavailable until the software migration is complete. Such conventional techniques can result in significant periods during which time the computer hardware is unable to provide services controlled by the software being replaced. This problem can become more pronounced in circumstances where there is a need for reliable quality of service, such as in networks and other systems where a high degree of availability may be required for certain services.

A known solution to such software migration has been to replace the computer hardware with new hardware programmed to provide the new or modified functionality or performance desired. This technique provides a rather crude approach to modifying the services provided by the computer hardware and results in undesirable and extended outages when the computer hardware is unable to support the services it is expected to provide to users, systems or other devices. Such extended outages can be disruptive to both the systems and the users that rely on the operation of the computer hardware. This solution also requires a manual replacement of all or portions of the computer hardware.

A common approach in the telecommunications industry for reducing the impact of a software migration on the services supported by the computer hardware involves providing duplicate computer hardware. In this latter case, control over available services is passed from the original computer hardware and software to the duplicate computer hardware with replacement software. This approach results in redundant computer hardware sitting idle or underutilized during normal operations when no software migration is taking place, as well as unnecessary complexity in the arrangement and configuration of the original and duplicated computer hardware.

Therefore, it would be desirable to develop an improved mechanism for software migration, which makes more efficient use of installed computer hardware while minimizing the impact on the availability of services during such software migration.

SUMMARY OF THE INVENTION

The above and related desires are addressed in the present invention by providing a novel and nonobvious method, apparatus, computer-readable program and system for migrating control of an active processing element from an in-service original software system to a replacement software system. In this specification, the term "processing element" refers to a processor (or processors) having, or in communication with, sufficient memory to store both the in-service original software system, the replacement software system and additional software supporting the transfer of control from the original software system to the replacement software system. When the processing element is "active", it is able to provide services to users or other computer hardware under the direction of a software system. In general, the term "software system" (original, replacement or otherwise) refers to one or more software components programmed to provide one or more services. Such "services" may be any functionality that is useful to the operation of the software system itself or to the operation of other associated computer hardware or software. Services are primarily externally visible to, or support external benefits visible to, users, systems or other computer hardware or other services. "In-service" is used in this specification to mean that the original software system has control over the processing element so as to make available via the processing element the services for which the original software system is programmed to provide. In addition, in the remainder of the specification which follows, the term "software migration" refers to a process of transferring control over the active processing element from the original software system to the replacement software system.

In accordance with one aspect of the invention, a method of performing a software migration is provided. In this method, the replacement software system is configured in memory associated with the active processing element and made ready to take control of the active processing element while the in-service original software system controls the active processing element. In order to make the replacement software system ready to take control, state information from the original software system is communicated to the replacement software system. Once the replacement software is installed and ready to take control of the active processing element, control over the active processing element is transferred from the original software system to the replacement software system. Performing a software migration on the active processing element while the original software system controls the active processing element removes the need for having a duplicate processing element to support the migration while substantially maintaining the availability of services on the processing element. By simplifying the hardware requirements and localizing much of the software migration to within the domain of the active processing element, the number and severity of service outages on the processing element arising during the software migration are also reduced. The term "service outage" refers here to periods when services, provided by a software system via the active processing element, are unavailable.

Although the present invention can be applied to a single processor environment, it also may be applied in a multi-processor (or multi-controller) environment. In fact, when the present invention is applied to a computer system with one or more spare processing elements, processor sparing can be maintained throughout the software migration. In conventional environments, processor sparing or duplication is implemented to provide equipment protection, or in other words, to protect the operation of computer system in the event a running processor, or other computer hardware associated with the processor, fails. In such conventional environments, equipment protection for a processing element is lost during software migration while the spare or duplicate processing element is used in the software migration. Thus, the present invention offers a more robust migration solution which is also applicable to processor spared systems.

In a preferred embodiment, the replacement software system is configured with provisioning information associated with a hardware and software configuration for the active processing element, and dynamic state information for the replacement software system is synchronized with dynamic state information for the original software system. In this specification, the term "provisioning information" refers to persistent state and configuration information for the software system controlling the active processing element. Provisioning information is meant to survive a power down or reset of the active processing element. The term "dynamic state information" refers to hardware and software state information for the active processing element which varies with time. In the case of the original software system, the dynamic state information includes the state of active services associated with the original software system, as well as hardware state information (of the active processing element) associated with such services. Thus, the dynamic state information for the original software system includes a software representation of the physical hardware state of the active processing element.

The replacement software system may be loaded in the course of, or prior to, the software migration. Loading and configuring the replacement software system while the original software system continues to run the active processing element avoids losing the services provided by the active processing element during these stages of the software migration. Adding the ability to synchronize the replacement software system with the original software system and the active processing element further reduces the susceptibility of services on the active processing element to extended outages during the migration. Preferably, the configuration and synchronization operations are carried out with the assistance of a virtual machine loaded into available memory within the active processing element and configured to support the transfer of control over the active processing element to the replacement software system. The virtual machine is a software or hardware component (or a combination of hardware and software) which provides a convenient mechanism for facilitating the software migration within the active processing element while minimizing the impact of the software migration on the ability of the active processing element to continue to provide services. The virtual machine may be newly initialized or previously loaded, provided that the virtual machine is configured to support the migration from the in-service original software system to the replacement software system.

In accordance; with another aspect of the invention, an apparatus is provided for supporting a software migration on an active processing element. The apparatus includes a virtual machine and a migration manager. The virtual machine provides an interface during the software migration between the original software system, the replacement software system and hardware elements of the active processing element. In a preferred embodiment, the virtual machine provides several components including a communications path, an interrupt dispatcher, a loader, a system scheduler and a hardware access control module. The communications path facilitates communications between the original software system and the replacement software system during the software migration. The interrupt dispatcher indirectly forwards hardware interrupts from the active processing element to one (or, where appropriate, both) of the original software system and the replacement software system. The loader installs an image of the replacement software system into available memory within the active processing element. The system scheduler schedules at least a portion of the processor resources of the active processing element between the execution of the original software system and the replacement software system during the software migration so that synchronization can take place between the state information for the two software systems while minimizing the impact of the migration on the services provided by the active processing element. The hardware access control module provides an access interface for the original and replacement software systems to access the active processing element. In this way, the hardware access control module protects the active processing element from being corrupted during the software migration.

According to another aspect of the invention, a system is provided which includes the virtual machine, the migration manager, and the active processing element. In variations where the virtual machine is implemented as a software system, the virtual machine is stored during the software migration in memory within or connected to the active processing element. Once loaded into the active processing element, the virtual machine serves as an interface between the active processing element and the original and replacement software systems.

In accordance with yet another aspect of the invention, another software migration system is provided. In this latter system, a unit is included for installing a replacement software system on an active processing element while an original software system controls the active processing element. Another unit is provided for configuring the replacement software system with provisioning information associated with a hardware and software configuration for the active processing element. A unit is also provided with the system in order to synchronize dynamic state information for the replacement software system with dynamic state information for the original software system. An additional unit is provided for transferring control over the active processing element to the replacement software system.

In another aspect of the invention, a computer readable medium having stored instructions is provided for supporting the installation, configuration and synchronization of a replacement software system on an active processing element while an in-service original software system controls the active processing element. Computer readable codes are also provided for transferring control over the active processing element to the replacement software system.

In yet another aspect of the invention, an apparatus is provided for supporting a software migration on an active processing element. The apparatus includes a virtual machine implemented to support a transfer of control over the active processing element from an original software system to a replacement software system.

Other aspects and features of the present invention will become apparent to those ordinarily skilled in the art upon review of the following description of specific embodiments of the invention in conjunction with the accompanying drawings.

BRIEF DESCRIPTION OF THE DRAWINGS

In the accompanying drawings which illustrate embodiments of the invention.

Figure 1:
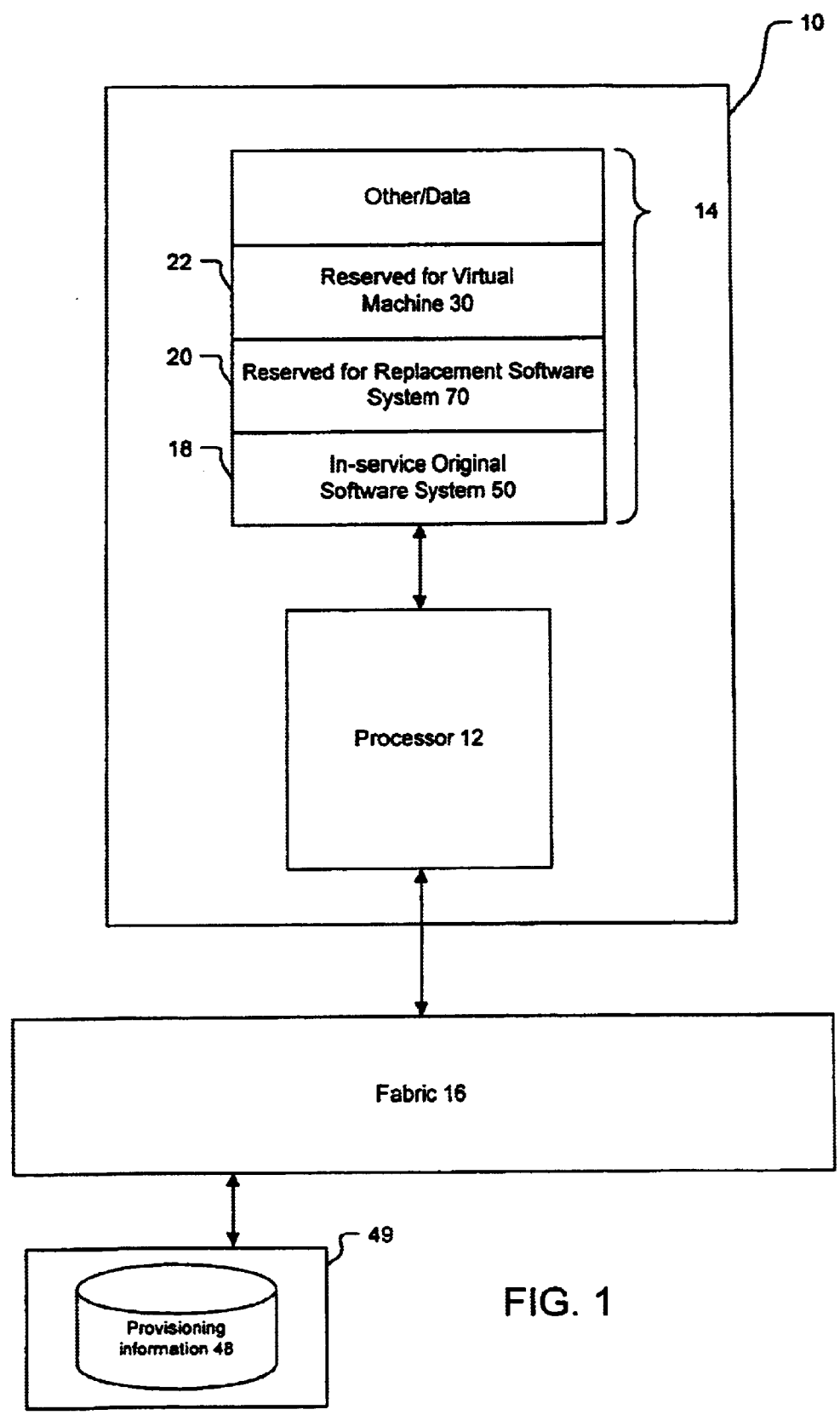
FIG. 1 is a schematic diagram of an active processing element in operation during a software migration according to a first embodiment of the invention.

It will be appreciated that for simplicity and clarity of illustration, elements illustrated in the accompanying drawings have not necessarily been drawn to scale. For example, the dimensions of some of the elements are exaggerated relative to other elements for clarity. Further, where considered appropriate, reference numerals and labels have been repeated among the drawings to indicate corresponding or analogous elements.

DETAILED DESCRIPTION OF THE INVENTION

Reference will now be made in detail to implementations and embodiments of the invention, examples of which are illustrated in the accompanying drawings.

This application is related to applicant's co-pending U.S. application Ser. No. 09/662,611 filed Sep. 15, 2000.

FIG. 1 shows a schematic diagram of an active processing element 10 in operation during a software migration according to a first embodiment of the invention. The active processing element 10 includes at least one processor 12 connected to memory 14 via a bus or other interface. Memory 14 comprises one or more memory banks configured to reserve acceptable amounts of memory for storing and supporting an in-service original software system 50, a virtual machine 30 and a replacement software system 70. Memory 14 may also be configured to provide memory for additional applications, systems and data. For purposes of illustrating the first embodiment, however, memory 14 is a single memory bank having separate memory partitions 18, 20 and 22 for the original software system 50, the replacement software system 70 and the virtual machine 30, respectively. The remainder of this description depicts the virtual machine 30 as software only. It will be noted, however, that when the virtual machine 30 is implemented in whole or in part as hardware or firmware, the functionality provided by the virtual machine 30 can be substantially the same as a pure software implementation.

Prior to the software migration, the active processing element 10 is loaded with and is under the control of the original software system 50 which directs the services provided by the active processing element 10 to one or more connected clients including, by way of example, another node in a switching network, a disk array, an operator terminal or other computer resources (not shown). Such services may be provided over communications fabric 16 or another acceptable communications mechanism. The nature of the services provided by the active processing element 10 under the direction of the in-service original software system 50 will vary with the particular implementation. By way of example, when the active processing element 10 is a functional processor included in a switching system or subsystem, the original software system 50 programs the active processing element 10 to provide and support switching services such as call and connection handling services. Of course, it will be appreciated that other acceptable processing elements (for example, single and multiple CPUS) and other acceptable services may be provided and are considered equivalent.

During the software migration, the active processing element 10 is preferably loaded with the replacement software system 70 which is installed and configured to take control of the active processing element 10. Once the replacement software system 70 takes control of the active processing element 10, the replacement software system 70 directs the active processing element 10 to provide substitute services. Preferably, these substitute services include existing services previously provided by the original software system 50 and additional services not available with the original software system 50.

In general terms, the replacement software system 70 may be any vintage of software and any number of software components configured to direct the active processing element 10 to provide one or more services. Thus, the replacement software system 70 may be, by way of example, an earlier version of the original software system 50, the same version of the original software system 50, or a subsequent version of the original software system 70 currently active on the active processing element 10.

Figure 2:
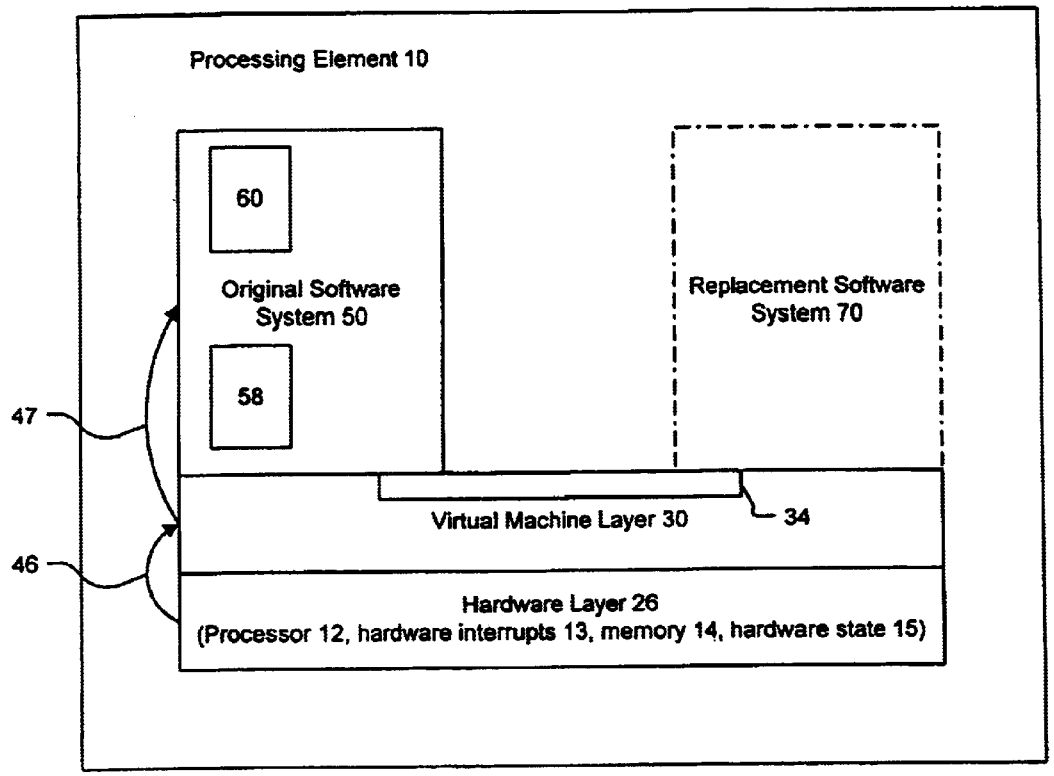
FIG. 2 is a schematic diagram of the active processing element during the software migration illustrated in FIG. 1.

FIG. 2 shows a schematic diagram of the active processing element 10 during the software migration in accordance with the first embodiment of the invention. As illustrated in FIG. 2, the virtual machine 30 provides a migration layer, which serves as a virtual interface between hardware and software elements for the software migration. When the original software system 50 or the replacement software system 70 is fully loaded, active and in control of the active processing element 10 under normal operating conditions, the virtual machine 30 is inactive or not present so that as much of the CPU time of the processor 12 as possible is available to support the operations of the software system in control of the active processing element 10.

As is further described below, the original software system 50 runs and manages the active processing element 10 while the replacement software system 70 is loaded into the second memory partition 20 (FIG. 1), provisioning information 48 (including provisioning data and provisioning code) is transferred to the replacement software system 70 (in step 116 of FIG. 6), and dynamic state information 80 for the replacement software system 70 is synchronized with dynamic state information 60 of the original software system 50 (in step 123 of FIG. 9). Once at least a minimal set of the dynamic state information 60 is transferred to the replacement software system 70 and transformed and synchronized to the extent sufficient to configure the replacement software system 70 to control at least a portion of the services provided by the active processing element 10, control over such portion of services passes to the replacement software system 70. Remaining dynamic state information and any other information required by the replacement software system 70 for full control over the services provided by the active processing element 10 are then transferred from the original software system 50 to the replacement software system 70 and converted to a format recognized by the replacement software system 70. As control over the services provided by processing element 10 passes to the replacement software system 70, active components of the original software system 50 which previously provided such services, via the processing element 10, are retired and rendered inactive.

Preferably, the replacement software system 70 is loaded into the second memory partition 20 (FIG. 1) with the assistance of the virtual machine 30 which may be either preloaded or newly loaded into memory partition 22. In operation, the virtual machine 30 may be partially or entirely resident in hardware or firmware within the active processing element 10 or it may be loaded directly into memory 14, although it is preferably fully resident in memory 14 for simplicity and ease of maintenance and substitution. The virtual machine 30 provides a migration interface for facilitating the transfer of control of the active processing element 10 from the original software system 50 to the replacement software system 70.

Figure 3:
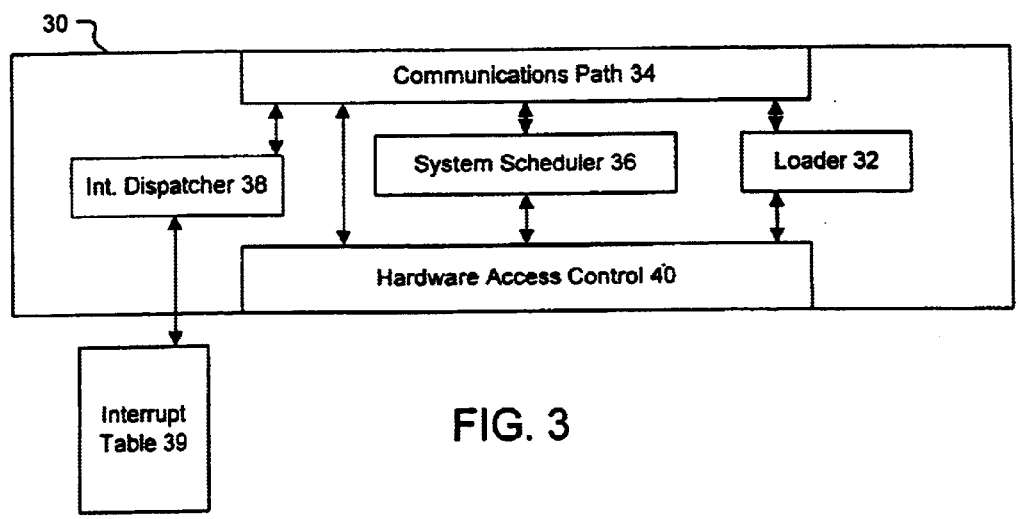
FIG. 3 is a schematic diagram of sub-components of a virtual machine of the first embodiment of the invention.

FIG. 3 shows a schematic diagram of the sub-components of the virtual machine 30 for the first embodiment of the invention. The virtual machine 30 is programmed to provide several migration-related services which are preferably encapsulated, for simplicity and maintainability, in several software components including a loader 32, a communications path 34, a system scheduler 36, an interrupt dispatcher 38 and a hardware access control module 40.

Referring to FIGS. 1 to 3, the loader 32 is configured to load an image of the replacement software system 70 into memory partition 20 and to start the execution of the image. The loader 32 resolves symbolic addresses of the replacement software system 70 at load time so that they are associated with the appropriate physical addresses in the hardware layer 26 and within the software system(s) with which the hardware layer 26 is loaded.

The communications path 34 provides a mechanism for establishing communication between the original software system 50 and the replacement software system 70 over the active processing element 10. As well, the communications path 34 provides a basis for communication between each of these systems (50 and 70) and, via the virtual machine 30, the components of the hardware layer 26 and external hardware and software components of other connected resources. The communications path 34 is preferred for single processor embodiments and implementations wherein both the original software system 50 and the replacement software system 70 reside on the same active processing element 10 during the software migration. In this latter case, the communications path 34 provides a safety mechanism so that processes of the original software system 50 do not write directly to memory dedicated to the replacement software system 70 and vice versa. In a spared processor environment, such as with a spared control processor environment, if there is only the original software system 50 or the replacement software system 70 present on a processor at any one time, then the benefits of the communications path 34 are not as significant. In the first embodiment, the communications path 34 is preferably a shared or local memory message queue comprising a queue of memory (preferably fixed) which is not part of either memory partition 18 or 20.

During the software migration, the system scheduler 36 handles the scheduling of the processor 12 resources and context switching on the processor 12 between the execution of the original software system 50 and the execution of the replacement software system 70. Preferably, the system scheduler 36 is implemented to provide time-shared scheduling with the ability to release the resources of the processor 12 for use by the waiting software system (original 50 or replacement 70) if such resources are not required by the currently scheduled software system. In a preferable mode of operation, the allocation of the processor 12 resources between the original software system 50 and the replacement software system 70 via the system scheduler 36 is substantially independent of how the processor 12 is managed by the software system (original or replacement) to which it is allocated at any one time.

The interrupt dispatcher 38 includes computer-readable code configured to intercept hardware interrupts for the active processing element 10 during the software migration and to forward such hardware interrupts to the appropriate interrupt handler of the software system (original 50 or replacement 70) in control of the active processing element 10. By intercepting such hardware interrupts and dispatching them to the appropriate software system (original 50 or replacement 70) during the software migration, the interrupt dispatcher 38 provides a convenient mechanism for managing hardware interrupts and for ensuring that the hardware interrupts are forwarding to the appropriate software system at each stage of the software migration. In general, prior to control over the active processing element 10 passing to the replacement software system 70, the hardware interrupts are forwarded by the interrupt dispatcher 38 to the original software system 50. Once control passes to the, replacement software system 70, the interrupt dispatcher 38 forwards the hardware interrupts to replacement software system 70.

In the first embodiment, the interrupt dispatcher 38 uses an interrupt table 39 to forward interrupts to the appropriate software system (original 50 or replacement 70). The interrupt table 39 includes an array of vectors comprising a first and second set of interrupt points addressed to one or the other of the original software system 50 and the replacement software system 70, or both. One example where certain vectors in the interrupt table 39 point to both the original software system 50 and the replacement software system 70 during the software migration is in the case of references to system clock interrupts. In this latter case, both software systems (50 and 70) need to know the state of the system clock interrupts during the software migration. Other cases may also arise depending upon the architecture of the active processing element 10.

The hardware access control module 40 manages the access control to the active processing element 10 and serves as an interface between the hardware layer 26 of the active processing element 10 and the original software system 50 and the replacement software system 70. The hardware access control module 40 protects the hardware layer 26 from being corrupted with invasive read and write instructions during the software migration from the software system (original 50 or replacement 70) which does not have control over the accessed components of the hardware layer 26. Thus, the hardware access control module 40 suppresses both software and hardware interrupts for the software system (original 50 or replacement 70) that does not presently control the active processing element 10. In this way, any invasive reads or writes to hardware registers by the software system (original or replacement) not in control of the active processing element 10 are blocked by the virtual machine 30.

Preferably, the virtual machine 30 is context independent and minimizes the amount of hardware resource management it performs over the hardware layer 26 so that the virtual machine 30 is easier to remove from the hardware interface path for the active processing element 10 once the software migration is complete. Thus, the virtual machine 30 preferably facilitates communication between the appropriate software system (original or replacement) and the hardware layer 26, but leaves hardware management for the active processing element 10 to the software system that currently controls the hardware.

FIGS. 4 to 12 show schematic diagrams illustrating the operation of the first embodiment of the invention. In FIGS. 4 to 12, steps in the operation of the first embodiment are identified by numerical labels that are marked as 100 and higher and that are inserted into lines representing the flow of operations. For ease of reference in the following discussion, reference is made to FIGS. 1 to 12 collectively.

In the first embodiment, the original software system 50 initially resides in the first memory partition 18 of memory 14 and controls the operation of the active processing element 10. In this initial condition, all of the processor 12 resources are available to the original software system 50. Under normal operating conditions when a software migration is not in progress, the original software system 50 resides in the first memory partition 18 while controlling the active processing element 10. In the first embodiment, the second memory partition 20 is reserved for use by the replacement software system 70.

The software migration preferably begins at step 100 with the loading and installation of a migration manager 58 into available memory within the original software system 50. The migration manager 58 is a software application that is responsible for coordinating portions of the software migration. An example of how the migration manager 58 may be used to coordinate and manage the software migration is illustrated in the description below of the first embodiment in operation. It should be noted that the migration manager 58 may also be programmed to report, via an external interface, to an administrator involved in the software migration with respect to the status of the software migration. The migration manager 58 may also handle intervention commands issued by the administrator to interrupt or modify the software migration.

Figure 4:
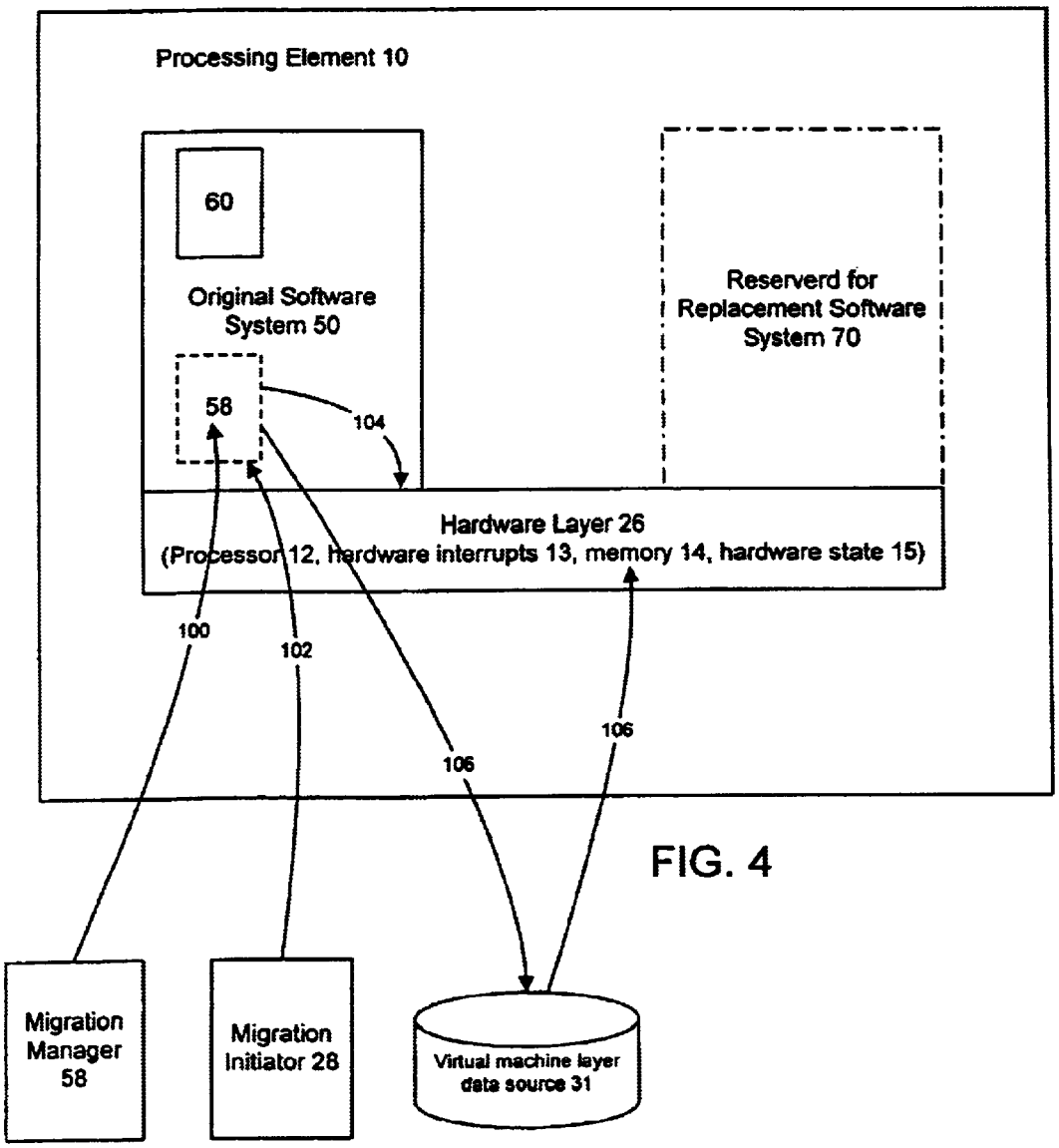
FIGS. 4 to 12 are schematic diagrams illustrating stages of the software migration of the active processing element for the first embodiment of the invention.

In step 100 of the first embodiment, the migration manager 58 is preferably responsible for directing the processor 12 to load, when necessary, a new version of the virtual machine 30 into memory 14. To begin the software migration, the migration manager 58 is activated at step 102 in response to a predetermined event recognized by the migration manager 58 as a migration initiation signal. Such a signal may be received from a migration initiator 28 such as an automated or manual command signal received by the migration manager 58 from the administrator via a network resource connected to the active processing element 10. In an alternative arrangement, the migration manager 58 already resides in available memory within the domain of the original software system 50 (as shown in FIG. 4) awaiting instructions to initiate a software migration.

Once activated, the migration manager 58 determines at step 104 if a version of the virtual machine 30 is present in the active processing element 10. When a version of the virtual machine 30 is found to be present, the migration manager 58 determines the version of the virtual machine 30 and assesses whether the version will support the current software migration. If a version of the virtual machine 30 is not present or if the version present will not support the current software migration, then the migration manager 58 programs the processor 12 at step 106 to retrieve and load from a data source 31 an appropriate version of the virtual machine 30 that will support the current software migration.

Figure 5:
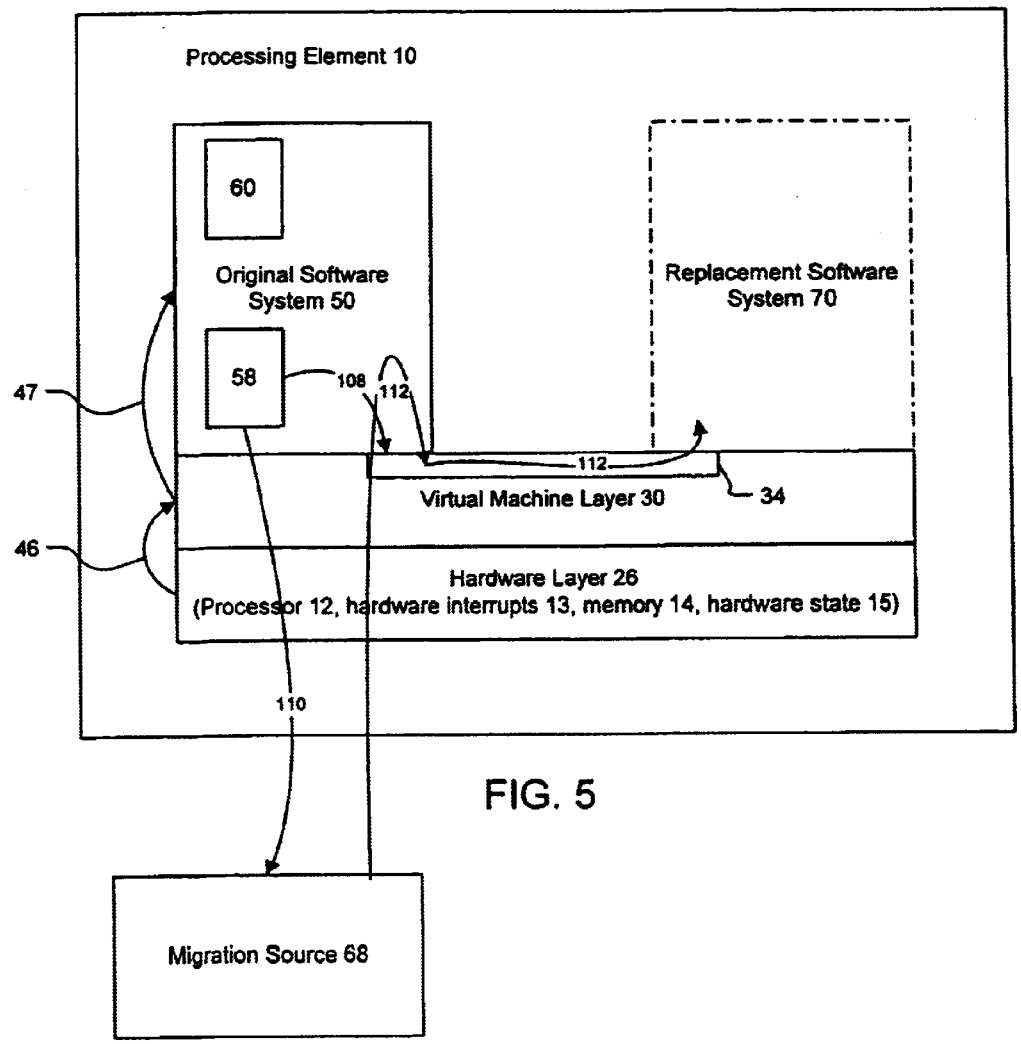

The migration manager 58 activates the loaded virtual machine 30 at step 108 (FIG. 5). When the virtual machine 30 is activated it activates the software components within itself to provide an interface for coordinating the operation of, and communication between, the active processing element 10, the original software system 50 and the replacement software system 70 during the software migration. Thus, in the first embodiment, the loader 32, the communications path 34, the system scheduler 36, the interrupt dispatcher 38 and hardware access control module 40 are each preferably activated at step 108 to support the virtual machine 30. The communications path 34 is activated in order to facilitate communications between the original software system 50 and the replacement software system 70.

The system scheduler 36 is activated to take control of scheduling of the resources of processor 12 between the original software system 50 and the replacement software system 70 during the software migration. The interrupt dispatcher 38 is activated to redirect hardware interrupts 13 from hardware layer 26 to the original software system 50 or the replacement software system 70 (or both) via an interrupt table 39. The redirection of hardware interrupts 13 is illustrated by interrupt paths 46 and 47. Prior to control of the processor 12 passing to the replacement software system 70, the interrupt dispatcher 38 redirects hardware interrupts 13 to the original software system 50. The hardware access control module 40 is activated as part of the virtual machine 30 to ensure that hardware registers in the active processing element 10 have read and write protection.

In operation, the hardware access control module 40 intercepts read and write instructions to hardware components of the active processing element 10 initiated by either the original software system 50 or the replacement software system 70. Read and write instructions which are intercepted by the hardware access control module 40 are either forwarded to be carried out on the associated hardware component(s) of the active processing element 10 or are blocked depending on the stage of the software migration and the source of the read and write instructions. Thus, prior to control over any of the services provided by the active processing element 10 passing to the replacement software system 70, read and write instructions affecting the hardware state of the active processing element 10 and originating from the replacement software system 70 are blocked to protect the integrity of the active processing element 10. On the other hand, read and write instructions directed to the hardware registers of the processing element 10 from components of the virtual machine 30 itself, such as from the communications path 34 or the system scheduler 36, are directed to their respective hardware registers in support of the software migration.

Once the virtual machine 30 is loaded, installed and activated in active processing element 10, the loader 32 proceeds to retrieve and load an image of the replacement software system 70 into the second memory partition 20 at steps 110 and 112. These latter steps may be performed under the coordination of the migration manager 58. The replacement software system 70 is loaded by the virtual machine 30 from a migration source 68 connected, directly or indirectly, to the active processing element 10. Such a migration source 68 may be, by way of example, flash memory, a network resource, or a permanent or removable storage device such as a hard disk drive, a floppy disk, DVD, a compact disc or the like.

Preferably, the software migration is performed during a period when the usage of the active processing element 10 is low and resource management of processor 12 is carried out primarily through the system scheduler 36. Alternatively, when the system scheduler 36 is activated, the replacement software system 70 can be initialized and scheduled to share the resources of the processor 12 with the original software system 50, although control over the active processing element 10 and the processor 12 remains at this stage with the original software system 50. Thus, as the replacement software system 70 is initialized and run on the active processing element 10 in this alternative mode, performance levels for the services provided by the original software system 50 are reduced, or "throttled-down", to allow the resources of processor 12 to be shared between the original software system 50 and the replacement software system 70. Such throttling of the services for the original software system 50 may be enforced by requiring a minimum elapsed time between the initiation of available services.

Figure 6:
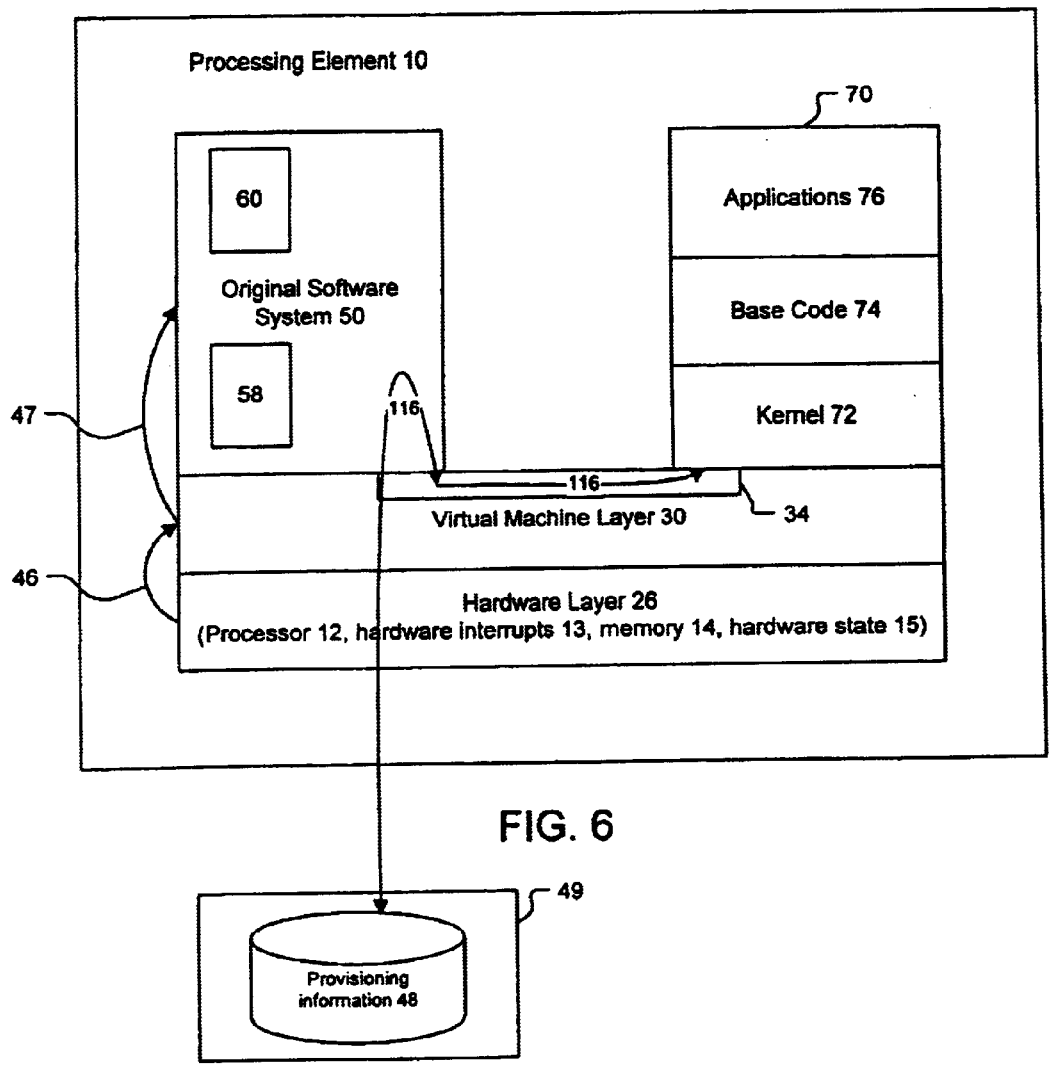

With the replacement software system 70 running on the active processing element 10, the migration manager 58 coordinates the transfer of the provisioning information 48 into the replacement software system 70 at step 116 (FIG. 6). The provisioning information 48 represents the persistent state and configuration information for the software system (original or replacement) controlling the active processing element 10 and which is meant to survive a power down or reset of the active processing element 10. In the first embodiment, the provisioning information 48 is loaded indirectly into the replacement software system 50 from a provisioning source 49 via the original software system 70. This is achieved by time-slicing with the system scheduler 36 between the original and replacement software systems (50 and 70) and by using the communications path 34 to transfer the provisioning information 48 to the replacement software system 70 via the original software system 70. In an alternative mode of operation, the provisioning information may be transferred directly from the provisioning source 49 to the replacement software system 70 via the virtual machine 30. Such a provisioning source may include a hard disk, flash memory, another processing element, or another resource having an acceptable storage device or memory device. The provisioning source 49 may even be a memory partition within memory 14 of the active processing element 10.

It is worth noting that the replacement software system 70 can take many forms and may comprise a single compiled set of computer-readable code or multiple compiled images which are loaded as required (see FIG. 6). Furthermore, loading the replacement software system 70 into the second memory partition 20 may proceed in several stages. By way of example, in the first embodiment the replacement software system 70 comprises a multi-image system, including a kernel 72, base code 74 and one or more applications 76, which are loaded in stages. The kernel 72 provides basic I/O operations for supporting communication between higher layer components of the replacement software system 70 and the hardware components of the active processing element 10. The base code 74 represents components of the replacement software system 70, including, by way of example, an operating system, which are required to support the operation of several or all of the higher level applications 76 which are configured to provide some or all of the services to be provided by the active processing element 10 once it is under the control of the replacement software system 70.

In the first embodiment, the kernel 72 is loaded into the second memory partition 20 at the direction of the virtual machine 30 including the loader 32. Preferably, the loader 32 loads the kernel 72 into memory 14 using an absolute base address defined for use by the kernel 72, although in a variation on the first embodiment, the kernel 72 may be relocatable to other addresses. Additional components of the replacement software system 70 are loaded into acceptable memory locations within memory 14 relative to the base address defined for the kernel 72 and have their symbolic addresses resolved at load time based on the base address definition.

Once the kernel 72 is loaded into the second memory partition 20, the kernel 72 is activated and the system scheduler 36 proceeds to share at least a portion of the processing resources of the processor 12 between the kernel 72 and the original software system 50. Further components of the replacement software system 70 are then loaded and initialized with the assistance of the kernel 72.

Preferably, the components loaded as part of the replacement software system 70 are demand driven so as to make efficient use of memory 14. Thus, when the base code 74 is loaded by the kernel 72, the type of active processing element 10 is identified by the kernel 72 so as to determine what type of provisioning information 48 is necessary to configure components of the base code 74 such as the operating system for the particular hardware configuration of the active processing element 10 in use. Thus, configuring (or initializing) the replacement software system 70 with the necessary provisioning information 48 in the first embodiment is preferably an interactive operation that cooperates with the loading of the replacement software system 70 early in the software migration. Configuration of the replacement software system 70 preferably begins even before all of the code for the replacement software system 70 is loaded. In fact, the initial components of the provisioning information 48 which are used to configure the base code 74 may also contribute to determining what software code and data will be loaded into the second memory partition 20 as part of the applications 76 for the replacement software system 70. Once the replacement software system 70 is loaded, more specific initialization operations are carried out by the base code 74 to configure specific services provided by the active processing element 10 that are to be operational when the migration to the replacement software system 70 is complete.

After the replacement software system 70 has been configured with the provisioning information 48 (see step 116 of FIG. 6), the migration manager 58 initiates the transfer of dynamic state information 60 of the original software system 50 to the replacement software system 70 via the communications path 34 at step 120. In general, dynamic state information represents hardware and software state information for the active processing element 10 which varies with time. In the case of the original software system 50, the dynamic state information 60 includes the state of active services associated with the original software system 50, as well as hardware state information (of the active processing element 10) associated with such services. Thus, the dynamic state information 60 for the original software system 50 includes a software representation of the physical hardware state of the active processing element 10.

Figure 7:
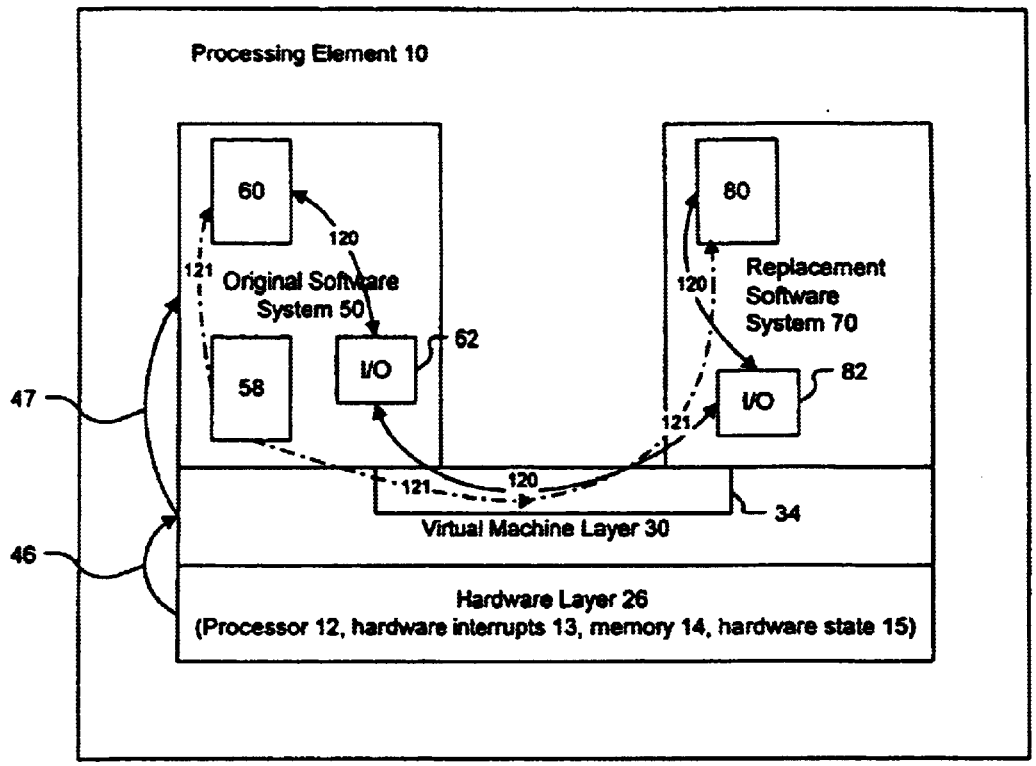
Figure 8:
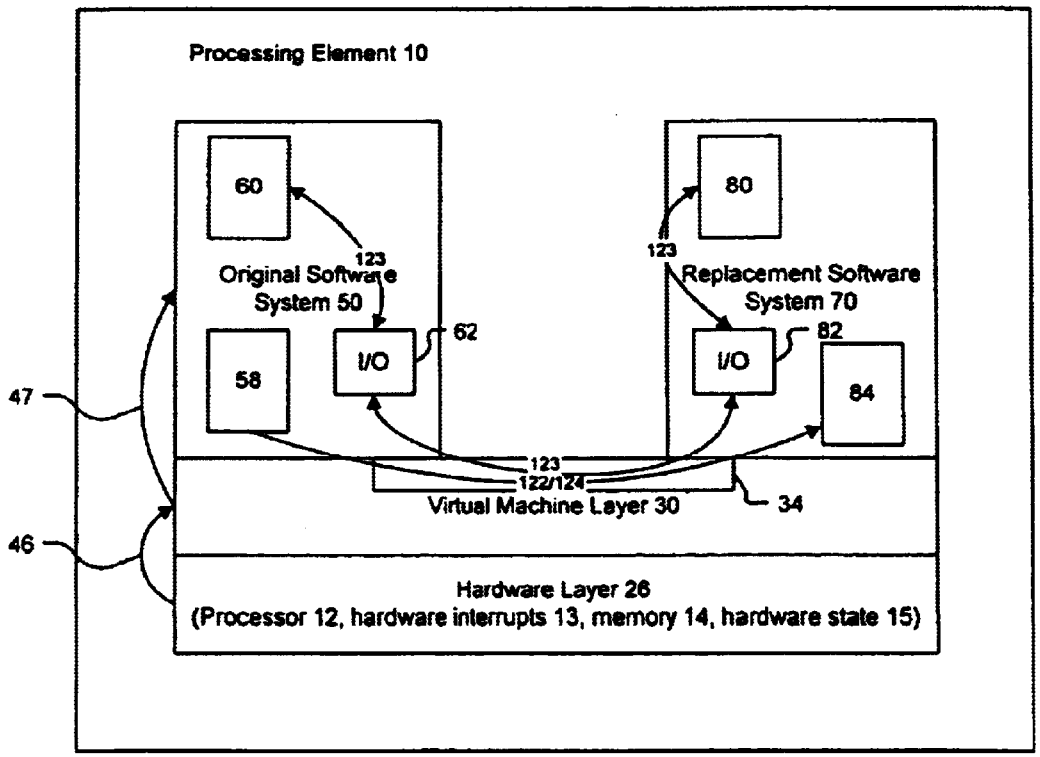

The dynamic state information 60 is preferably transferred to the replacement software system 70 via I/O interfaces 62 and 82 and communications path 34 (FIG. 7). The I/O interfaces 62 and 82 provide a synchronization mechanism for transferring the dynamic state information 60 to the replacement software system 70 for transformation into the dynamic state information 80, and for synchronizing the dynamic state information 80 of the replacement software system 70 with the dynamic state information 60 of the original software system 50 at least until control over the active processing element 10 passes to the replacement software system 70.

Preferably, the dynamic state information 60 represents dynamic state information that is critical to synchronizing state information for the replacement software system 70 with state information for the original software system 50. Thus, portions of the dynamic state information of the original software system 50 which are inconsequential to the transfer of control over the active processing element 10 or to the synchronization of dynamic state information between the original software system 50 and the replacement software system 70 for the purposes of maintaining services may be discarded during or following the transfer of control.

As dynamic state information 60 from the original software system 50 is received by the I/O interface 82 of the replacement software system 70, the dynamic state information 60 is transformed into a format recognized by the replacement software system 70. This transformation includes mapping the dynamic state information 60 into data structures recognized by the replacement software system 70. The transformed dynamic state information 60 is stored as the dynamic state information 80 for the replacement software system 70. Once the replacement software system 70 is loaded with the dynamic state information 80, the migration manager 58 coordinates the synchronization of the dynamic state information 80 with the dynamic state information 60 of the original software system 50 (as illustrated at step 121 in FIG. 7) until control over the active processing element 10 passes to the replacement software system 70. Control over the active processing element 10 is transferred to the replacement software system 70 as existing services provided by the original software system 50 are replaced by services provided by the replacement software system 70. Thus, the synchronization between the dynamic state information 80 of the replacement software system 70 and its original counterpart 60 is maintained by the synchronization mechanism provided by I/O interfaces 62 and 82 at least until the existing services controlling the active processing element 10 are replaced by the services of the replacement software system 70 (as illustrated by step 123 in FIG. 8). In order to maintain such a synchronization, state changes to the dynamic state information 60 for the original software system 50 are recorded as such state changes occur. The recorded information is then transferred to the replacement software system 70 where it is used to synchronize the dynamic state information 80.

Preferably, in order to minimize the degree to which active services provided by the active processing element 10 are impacted, the dynamic state information 60 transferred and transformed into dynamic state information 80 at step 120 is sufficient to allow the replacement software system 70 to take control of a subset of the services supported by the active processing element 10. For example, at this stage an image of the dynamic state information 60 sufficient to permit the replacement software system 70 to control new requests for services may be transferred, transformed and synchronized while the remaining dynamic state information 60 is temporarily maintained within the domain of the original software system 50. In another preferred mode of operation, the dynamic state information 60 that is transferred and transformed into the dynamic state information 80 is sufficient to permit the replacement software system 70 to take control of all services supported by the active processing element 10.

Once the transferred subset of dynamic state information is transformed into part of the dynamic state information 80 of the replacement software system 70 and synchronized with the corresponding dynamic state information 60 in the original software system 50, the migration manager 58 activates at step 122 (FIG. 8) the replacement software system 70 and passes control of the active processing element 10 from the original software system 50 to the replacement software system 70 to the extent such passing of control is supported by the transferred and transformed portion of the dynamic state information 60. In conjunction with step 122, the migration manager 58 invokes the virtual machine 30 at step 124 to instruct the replacement migration manager 84, loaded as part of the replacement software system 70, to take control of the software migration. For the first embodiment illustrated, this latter instruction is communicated to the replacement migration manager via the communication path 34.

Once the replacement software system 70 has been activated, all new requests for services-supported by the dynamic state information 80 that require handling by the active processing element 10 are processed by the replacement software system 70, with the original software system 50 being blocked by the replacement migration manager 84 from handling such new requests.

All control messages for controlling the active processing element 10, at least in respect of the services activated by the new requests, are also handled by the replacement software system 70 following its activation.

Figure 9:
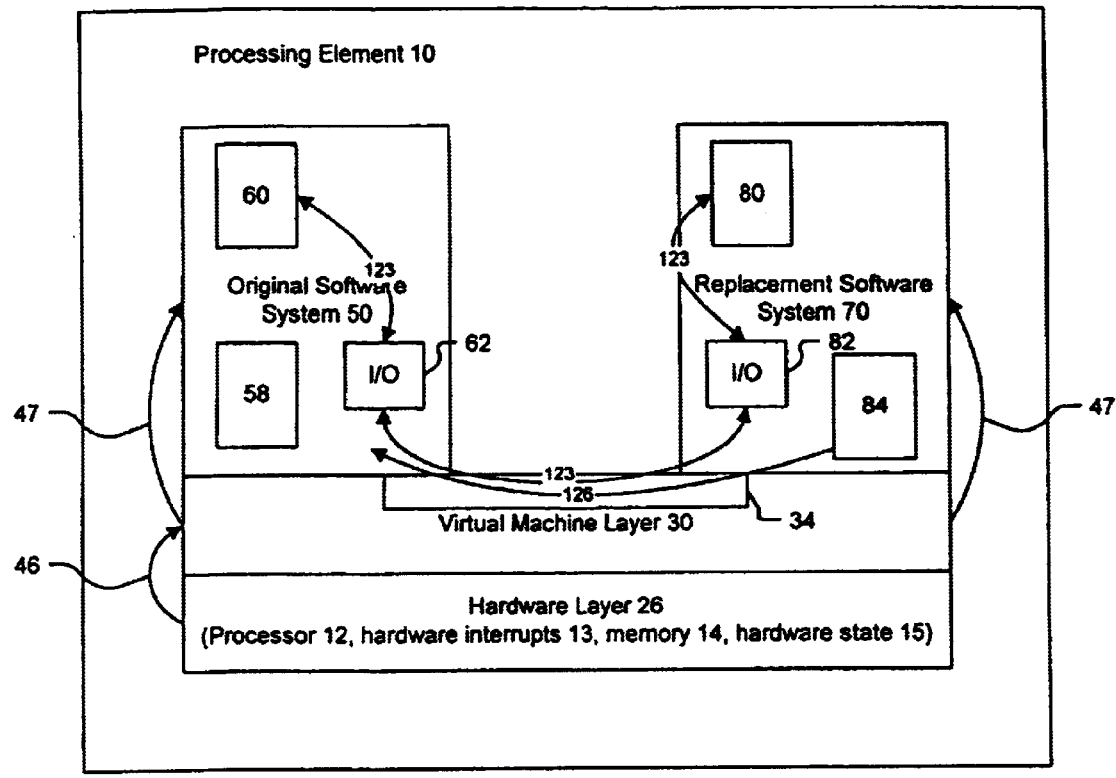
Figure 10:
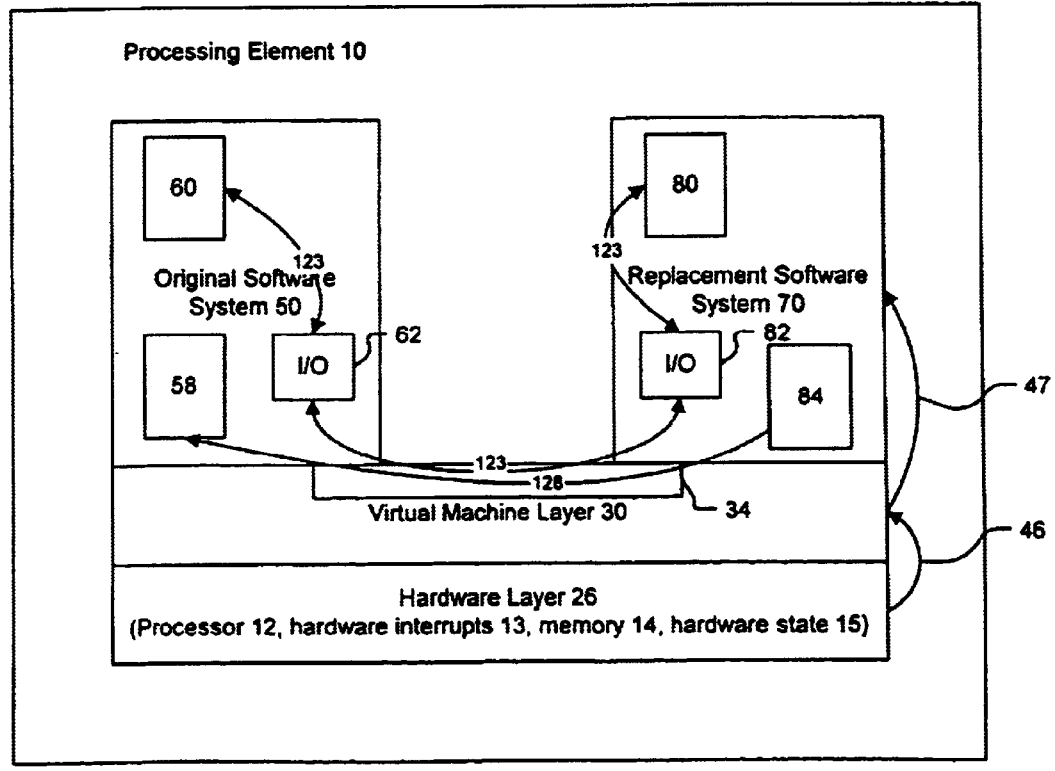

At this stage, the original software system 50 is quiesced at step 126 at the direction of the replacement migration manager 84 via the communications path 34 (FIG. 9). Quiescing the original software system 50 involves placing it into a stable inactive state wherein it no longer controls hardware elements of the active processing element 10, although the original software system 50 may still use processing resources of the processor 12 to handle data for any remaining synchronization between the original software system 50 and the replacement software system 70. If control over the ability of the active processing element 10 to provide all available services is passed to the replacement software system 70 in a single stage, then the original software system 50 is fully quiesced. However, if control passes in several stages, then the original software system 50 is only partially quiesced a this stage and the corresponding components of the original software system 50 required to continue to support services not yet under the control of the replacement software system 70 remain active.

During step 126, there may be a temporary, yet complete suspension of services provided by the active processing element 10. This temporary, complete loss of service is preferably limited to no more than the period in which control over the active processing element 10 actually passes in step 126 from the original software system 50 to the replacement software system 70. In this way, the outage period in which the active processing element 10 is unable to provide any services is minimized to a small portion of the software migration.

Following the passing of at least partial control over the active processing element 10 in step 126 to the replacement software system 70, services which were temporarily suspended are resumed. In the case where performance levels of services were previously throttled-down during the software migration, the processing of supported services is still throttled down below maximum allowable processing resources to allow the processor 12 to run remaining components of the original software system 50 and to support the remainder of the software migration.

Active services existing prior to control of the active processing element 10 passing to the replacement software system 50 preferably continue to be handled by the original software system 50 until those active services are transferred to the replacement software system 70 under the coordination of the replacement migration manager 84 in step 128 (FIG. 10) or, alternatively, under the coordination of the replacement migration manager 84. This preferable mode of operation provides a convenient mechanism for passing primary control of the active processing element 10 over to the replacement software system 70 without having to simultaneously transfer control of all previously existing services handled by the active processing element 10. In the alternative, control over previously existing and new services may pass simultaneously to the replacement software system 70, although this will result in a more significant instantaneous impact on the ability of the active processing element 10 to maintain services as greater processing resources are required to perform such a simultaneous task.

Once control over all services provided by the processing element 10 are transferred (for instance, at step 128 in the first embodiment), the replacement software system 70 takes complete control over the processing element 10. When control over the processing element 10 passes to the replacement software system 70, the hardware interrupts 13 on the processing element 10 are forwarded to the replacement software system 70 through the interrupt table 39 managed by the interrupt dispatcher 38. Redirecting the hardware interrupts 13 may occur in stages (as shown, by way of example, in FIGS. 9 to 11).

Advantageously, up to step 124, the software migration can be reversed without requiring significantly more overhead or steps. Before the replacement software system 70 is activated, rolling back the software migration merely involves releasing the newly allocated resources for the replacement software system 70 and unloading the replacement software from the second memory partition 20. After new services have been initiated with the replacement software system 70 or previous services have been transferred to the replacement software system 70 for further operation, a migration rollback involves transferring such new or previous services and the corresponding new or modified dynamic state information back to the domain of the original software system 70.

In a variation of the first embodiment in which a migration rollback is supported following step 124, the synchronization of dynamic state information 60 and 80 is supported in the opposite, direction, wherein data having the form recognized by the replacement software system 70 is converted into a form suitable for use by the original software system 50. In this latter configuration, the virtual machine 30 and the original and replacement migration managers (58 and 84) are configured to support bi-directional migration of provisioned information and dynamic state information. Performing the software migration in reverse, from the replacement software system 70 to the original software system 50, is substantially the same as the opposite direction with the exception that the translation of dynamic state information is preferably performed in the replacement software system 70 before being transferred to the original software system 50. The translation of dynamic state information occurs, in this case, in the replacement software system 70 since the original software system 50 will have no possible knowledge of subsequent data structures found in the replacement software system 70.

Figure 11:
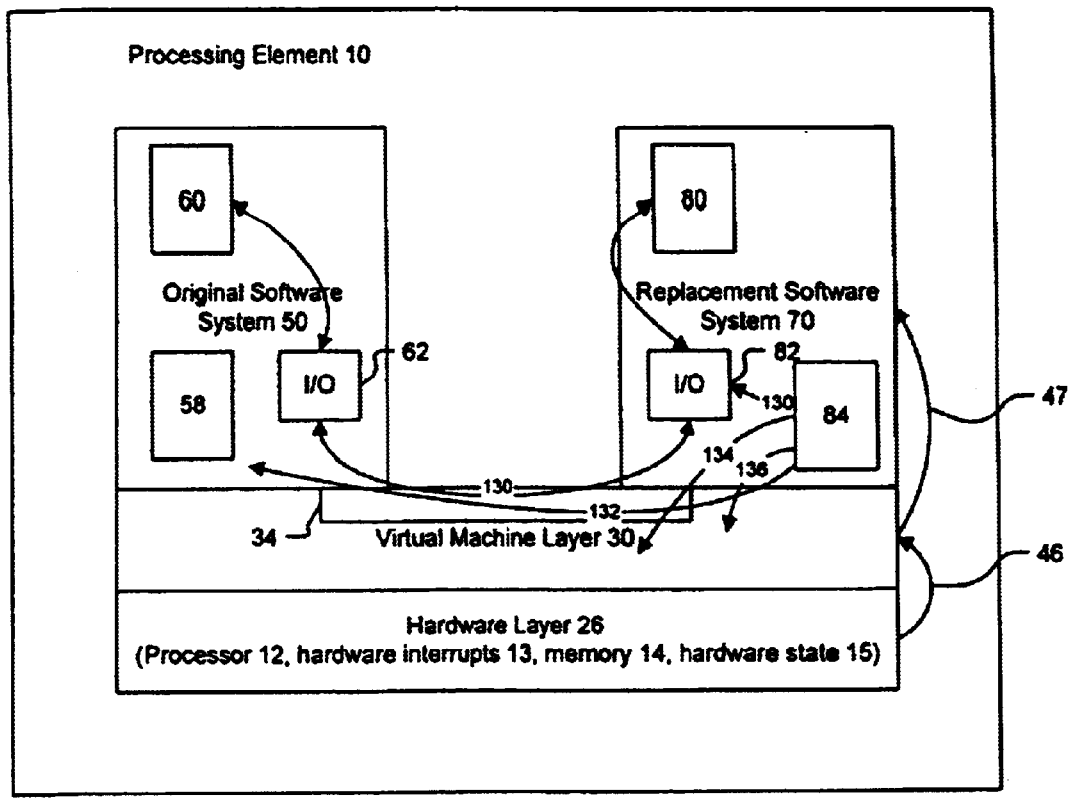

Following the activation of the replacement software system 70, remaining elements of the dynamic state information 60 which were not previously transferred are passed to the replacement software system 70 at step 130 and synchronized under the coordination of the replacement migration manager 84 and the virtual machine 30 (FIG. 11). With all control of the active processing element 10 having been passed to the replacement software system 70 and all dynamic data transfer and synchronization complete, the replacement migration manager 84 fully disables the original software system 50 at step 132 and instructs the virtual machine 30 to schedule all processing resources of the processor 12 for the replacement software system 70 at step 134 (FIG. 11). The replacement migration manager 84 then instructs the virtual machine 30 at step 136 to remove all references to software elements which were part of the execution of the original software system 50, including the deregistration of functions and any objects, and the deletion of tasks and components which were part of the original software system 50. At step 136, the replacement migration manager 84 further coordinates the release of all system resources within the active processing element 10 which were allocated by the original software system 50, including heap memory, semaphores, sockets, file handles and the like (FIG. 11). Following step 136, the original software system 50 is unloaded by the virtual machine 30 and the first memory partition 18 is returned to the system resource pool for the active processing element 10. In an alternative mode, the pages of memory in the first memory partition 18 are reserved for future migrations.

Figure 12:
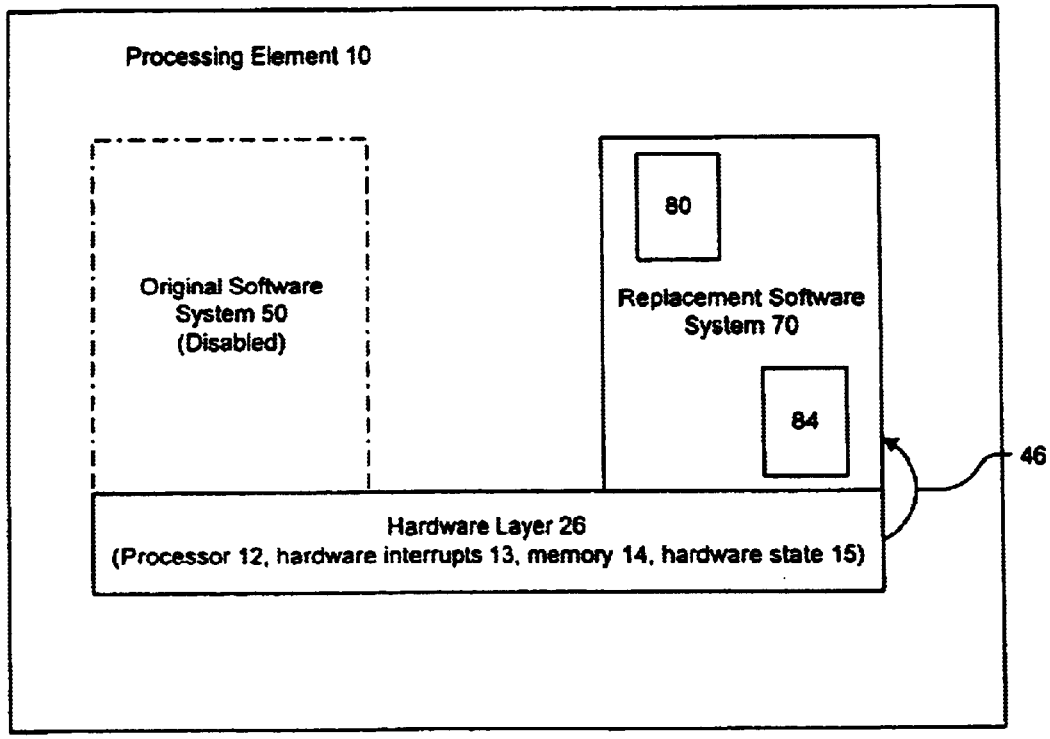

With all processing resources of the processor 12 allocated to the replacement software system 70, the throttling-down of processing services, when included in an implementation, is preferably turned off at step 136 by the migration manager 58 (FIG. 11). Once full control over the active processing element 10 has passed to the replacement software system 70 and the original software system 50 has been completely disabled, the migration services provided by the virtual machine 30 are no longer required by the active processing element 10 (see FIG. 11). At this stage, the components of the virtual machine 30 are preferably disabled, including the loader 32, the communications path 34, the system scheduler 36, the interrupt dispatcher 38 and the hardware access control module 40. Disabling the virtual machine 30 upon completion of the software migration minimizes the parasitic load on the processor 12. With the virtual machine 30 disabled, the replacement software system 70 interfaces directly with the hardware layer of the active processing element 10 and interrupts are forwarded directly to the replacement software system 70, as illustrated in FIG. 12, rather than indirectly through the interrupt dispatcher 38, as illustrated, for example, in FIG. 11. Although it is disabled, the virtual machine 30 may continue to reside, in whole or in part, in memory 14, or it may be removed altogether.

Although this invention has been described with reference to illustrative and preferred embodiments of carrying out the invention, this description is not to be construed in a limiting sense. Various modifications of form, arrangement of parts, steps, details and order of operations of the embodiments illustrated, as well as other embodiments of the invention, will be apparent to persons skilled in the art upon reference to this description. It is therefore contemplated that the appended claims will cover such modifications and embodiments as fall within the true scope of the invention.

What is claimed is:

1. A method of performing a software migration, the method comprising:

configuring a replacement software system in memory associated with an active processing element white an original software system controls the active processing element;

wherein configuring comprises communicating state information from the original software system in control of the active processing element to the replacement software system so as to prepare the replacement software system to take cone of the active processing element;

wherein configuring further comprises activating a virtual machine executed by the active processing element to support the transfer of control over the active processing element to the replacement software system;

transferring control of the active processing element to the replacement software system; and installing the virtual machine in memory within the active processing element for the software migration and deactivating and removing the virtual machine once control over the active processing element is transferred to the replacement software system.

2. The method of claim 1, wherein configuring further comprises initializing the replacement software system with provisioning information associated with a hardware and software configuration of the active processing element.

3. The method of claim 2, wherein configuring further comprises identifying hardware and software characteristics of the active processing element and configuring the replacement software system with the provisioning information based on the identified hardware and software characteristics.

4. The method of claim 1, wherein communicating further comprises synchronizing dynamic state information for the replacement software system with dynamic state information for the original software system.

5. The method of claim 4, further comprising maintaining the synchronization of the dynamic state information for the replacement software system with the dynamic state information for the original software system at least until services provided by the original software system via the active processing element are replaced by services provided by the replacement software system.

6. The method of claim 1, further comprising placing components of the original software system into an inactive state as control over the active processing element passes to the replacement software system.

7. The method of claim 1, further comprising disabling the original software system once control over the active processing element passes to the replacement software system.

8. The method of claim 1, further comprising releasing hardware resources of the active processing element used by the original software system once control over the active processing element passes to the replacement software system.

9. The method of claim 1, further comprising temporarily suspending services provided by the original software system via the active processing element as control passes from the original software system to the replacement software system.

10. The method of claim 1, further comprising sharing processing resources of the active processing element during the software migration.

11. The method of claim 1, further comprising performing the transfer of control over the active processing element to the replacement software system via the virtual machine.

12. The method of claim 1, further comprising reserving a portion of memory in the active processing element for the replacement software system before performing them software migration.

13. The method of claim 1, wherein the method is performed on a plurality of processors located in, or associated with, the active processing element.

14. The method of claim 1, further comprising allocating processor resources of the active processing element between the original software system and the replacement software system independent of how the processor resources are managed within either of the original software system and the replacement software system.

15. The method of claim 1, wherein:
configuring further comprises initializing the replacement software system with provisioning information associated with a hardware and software configuration for the active processing element; and
communicating further comprises synchronizing dynamic state information for the replacement software system with dynamic state information for the original software system.

16. The method of claim 15, further comprising maintaining the synchronization of the dynamic state information for the replacement software system with the dynamic state information for the original software system at least until services provided by the original software system via the active processing element are replaced by services provided by the replacement software system.

17. The method of claim 16, wherein the initialization of the replacement software system comprises identifying hardware and software characteristics of the active processing element and configuring the replacement software system with the provisioning information based on the identified hardware and software characteristics.

18. The method of claim 17, further comprising releasing hardware resources of the active processing element used by the original software system once control over the active processing element passes to the replacement software system.

19. The method of claim 18, further comprising placing components of the original software system into an inactive state as control over the active processing element passes to the replacement software system.

20. The method of claim 19, further comprising disabling the original software system once control over the active processing element passes to the replacement software system.

21. The method of claim 20, further comprising temporarily suspending services provided by the original software system via the active processing element as control over the active processing element passes from the original software system to the replacement software system.

22. The method of claim 21, wherein configuring further comprises activating a virtual machine executed by the active processing element to support the transfer of control over the active processing element to the replacement software system.

23. The method of claim 22, further comprising sharing processing resources of the active processing element during the software migration.

24. The method of claim 22, further comprising performing the transfer of control over the active processing element to the replacement software system via the virtual machine.

25. The method of claim 21, further comprising reserving a portion of memory in the active processing element for the replacement software system before performing the software migration.

26. The method of claim 17, further comprising allocating processor resources of the active processing element between the original software system and the replacement software system independent of how the processor resources are managed within either of the original software system and the replacement software system.

27. A method of performing a software migration, the method comprising:
configuring a replacement software system in memory associated with an active processing element while an original software system controls the active processing element;
wherein configuring comprises communicating state information from the original software system in control of the active processing element to the replacement software system so as to prepare the replacement software system to take control of the active processing element;

transferring control of the active processing element to the replacement software system;

wherein configuring further comprises initializing the replacement software system with provisioning information associated with a hardware and software configuration for the active processing element;

wherein communicating further comprises synchronizing dynamic state information for the replacement software system with dynamic state information for the original software system;

maintaining the synchronization of the dynamic state information for the replacement software system with the dynamic state information for the original software system at least until services provided by the original software system via the active processing element are replaced by services provided be the replacement software system;

wherein the initialization of the replacement software system comprises identifying hardware and software characteristics of the active processing element and configuring the replacement software system with the provisioning information based on the identified hardware and software characteristics;

releasing hardware resources of the active processing element used by the original software system once control over the active processing element passes to the replacement software system;

placing components of the original software system into an inactive state as control over the active processing element passes to the replacement software system;

disabling the original software system once control over the active processing element passes to the replacement software system;

temporarily suspending services provided by the original software system via the active processing element as control over the active processing element passes from the original sooftware system to the replacement software system;

wherein configuring further comprises activating a virtual machine executed by the active processing element to support the transfer of control over the active processing element to the replacement software system; and installing the virtual machine in memory within the active processing element for the software migration and deactivating and removing the virtual machine once control over the active processing element is transferred to the replacement software system.

28. Apparatus for supporting a software migration on an active processing element from an original software system to a replacement software system, the apparatus comprising:

(a) a virtual machine, activated to software the software migration, for interfacing between the active processing element, the original software system and the replacement software system; and (b) a migration manager for coordinating, in cooperation with the virtual machine, a transfer of control over the active processing element from the original software system to the replacement software system;

(c) wherein the virtual machine comprises a system scheduler for scheduling, during the software migration, processor resources of the active processing element between the execution of the original software system and the replacement software system.

29. The apparatus of claim 28, wherein the virtual machine further comprises a communications path for facilitating communications between the original software system and the replacement software system during the transfer of control over the active processing element.

30. The apparatus of claim 28, wherein the virtual machine further comprises an interrupt dispatcher for indirectly forwarding hardware interrupts from the active processing element to at least one of the original software system and the replacement software system in control of the active processing element.

31. The apparatus of claim 28, wherein the virtual machine further comprises a loader for installing an image of the replacement software system into available memory within the active processing element.

32. The apparatus of claim 28, wherein the system scheduler is implemented to allocate the processor resources to the original software system and the replacement software system independent of how the processor resources are managed within either of the original software system and the replacement software system.

33. The apparatus of claim 28, wherein the virtual machine further comprises a hardware access control module for managing access control to a hardware layer of the active processing element.

34. The apparatus of claim 28, wherein the virtual machine further comprises a plurality of software codes executed by the active processing element.

35. The apparatus of claim 28, wherein the migration manager further comprises a plurality of software codes executed by the active processing element.

36. The apparatus of claim 28, further comprising an interface for synchronizing, in cooperation with the virtual machine, dynamic state information of the replacement software system with dynamic state information of the original software system during the software migration.

37. A system comprising:
(a) the apparatus of claim 28;
(b) the active processing element; and
(c) an interface for synchronizing, in cooperation with the virtual machine, dynamic state information of the replacement software system with dynamic state information of the original software system during the software migration on the active processing element.

38. The system of claim 37, wherein:
the active processing element has memory and at least one processor in communication with the memory; and
wherein the virtual machine is located in at least one of (i) the memory of the active processing element, (ii) hardware associated with the active processing element, and (iii) firmware associated with the active processing element.

39. The system of claim 38, wherein the memory further comprises a memory partition for storing the original software system and wherein the migration manager is located within the memory partition.

40. The system of claim 39, further comprising a replacement migration manager for coordinating a portion of the transfer of control over the active processing element once at least a portion of control over the active processing element passes to the replacement software system.

41. The system of claim 40, wherein the replacement migration manager is stored within a region of the memory associated with the replacement software system.

42. Apparatus for supporting a software migration on an active processing element, the apparatus comprising:
(a) a virtual machine implemented to support a transfer of control over the active processing element from an original software system to a replacement software system, the virtual machine comprising:

(i) a communications path implemented to facilitate communications between the original software system and the replacement software system during the transfer of control over the active processing element;

(ii) an interrupt dispatcher implemented to indirectly forward hardware interrupts from the active processing element to at least one of the original software system and the replacement software system in control of the active processing element;

(iii) a loader implemented to install an image of the replacement software system into available memory within the active processing element;

(iv) a system scheduler implemented to schedule during the software migration at least a portion of the processor resources of the active processing element between the execution of the original software system and the replacement software system; and (v) a hardware access control module implemented to manage access control to a hardware layer of the active processing element.

43. The apparatus of claim 42, wherein the system scheduler is implemented to allocate the processor resources to the original software system and the replacement software system independent of how the processor resources are managed within either of the original software system and the replacement software system.

44. A computer readable medium having stored instructions for supporting a software migration on an active processing element from an original software system to a replacement software system, the computer readable medium comprising:

(a) computer readable codes for activating a virtual machine, activated to support the software migration, for interfacing between the active processing element, the original software system and the replacement software system; and (b) computer readable codes for configuring a migration manager for coordinating, in cooperation with the virtual machine, a transfer of control over the active processing element from the original software system to the replacement software system;

(c) wherein the virtual machine comprises a system scheduler for scheduling, during the software migration, processor resources of the active processing element between the execution of the original software system and the replacement software system.

45. The computer readable medium of claim 44, further comprising computer readable codes for disabling the original software system one control over the active processing element passes to the replacement software system.

46. The computer readable medium of claim 45, further comprising computer readable codes for placing the original software system into an inactive state as control over the active processing element passes to the replacement software system.

47. The computer readable medium of claim 46, further comprising computer readable codes for releasing hardware resources of the active processing element used by the original software system once control over the active processing element passes to the replacement software system.

48. The computer readable medium of claim 47, further comprising computer readable codes for temporarily suspending services supported by the active processing element as control passes from the original software system to the replacement software system.

49. The computer readable medium of claim 44, further comprising computer readable codes for allocating processor resources of the active processing element between the original software system and the replacement software system independent of how the processor resources are managed within either of the original software system and the replacement software system.

50. A system for performing a software migration on an active processing element from an original software system to a replacement software system, the system comprising:

(a) means for activating a virtual machine, activated to support the software migration, for interfacing between the active processing element, the original software system and the replacement software system; and (b) means for configuring a migration manager for coordinating, in cooperation with the virtual machine, a transfer of control over the active processing element from the original software system to the replacement software system;

(c) wherein the virtual machine comprises a system scheduler for scheduling, during the software migration, processor resources of the active processing element between the execution of the original software system and the replacement software system.

51. The system of claim 50, further comprising means for managing the transfer of control over the active processing element to the replacement software system during the software migration.

52. The system of claim 51, further comprising means for disabling the original software system once control over the active processing element passes to the replacement software system.

53. The system of claim 52, further comprising means for communicating between the replacement software system and the original software system during the software migration.

54. The system of claim 50, further comprising means for allocating processor resources of the active processing element between the original software system and the replacement software system independent of how the processor resources are managed within either of the original software system and the replacement software system.

* * * * *

UNITED STATES PATENT AND TRADEMARK OFFICE
CERTIFICATE OF CORRECTION

PATENT NO. : 6,698,017 B1  Page 1 of 1
DATED : February 24, 2004
INVENTOR(S) : Peter Joseph Adamovits, Keith Clifford Dysart and Louis Pierre Berube It is certified that error appears in the above-identified patent and that said Letters Patent is hereby corrected as shown below:

Title page,
Item [75], Inventors' residences, delete "Carleton Place" and substitute -- Ontario -- therefor; delete "Stitsville" and substitute -- Ontario -- therefore; delete "Carp" and substitute -- Ontario -- therefor.

Column 16,
Line 52, delete "white" and substitute -- while -- therefor.
Line 60, delete "cone" and substitute -- control -- therefor.

Column 17,
Line 52, delete "them" and substitute -- the -- therefor.

Column 19,
Line 17, delete "be" and substitute -- by -- therefor.

Column 21,
Line 50, delete "one" and substitute -- once -- therefor.

Signed and Sealed this

Twenty-first Day of December, 2004

JON W. DUDAS
*Director of the United States Patent and Trademark Office*